US009341225B2

(12) United States Patent
Mulder

(10) Patent No.: US 9,341,225 B2
(45) Date of Patent: May 17, 2016

(54) DEVICE FOR ISOLATING AN OBJECT FROM EXTERNAL MOTIONS

(75) Inventor: Jan H. Mulder, Hengelo (NL)

(73) Assignee: THALES NEDERLAND B.V., Hengelo (NL)

( * ) Notice: Subject to any disclaimer, the term of this patent is extended or adjusted under 35 U.S.C. 154(b) by 57 days.

(21) Appl. No.: 13/700,779

(22) PCT Filed: May 26, 2011

(86) PCT No.: PCT/EP2011/058675
§ 371 (c)(1),
(2), (4) Date: Nov. 29, 2012

(87) PCT Pub. No.: WO2011/151254
PCT Pub. Date: Dec. 8, 2011

(65) Prior Publication Data
US 2013/0068918 A1    Mar. 21, 2013

(30) Foreign Application Priority Data
Feb. 6, 2010  (EP) .................................... 10164781

(51) Int. Cl.
*F16F 7/14*     (2006.01)
*F16F 15/06*    (2006.01)

(52) U.S. Cl.
CPC .. *F16F 7/14* (2013.01); *F16F 15/06* (2013.01)

(58) Field of Classification Search
USPC ................... 248/562, 566, 638; 267/148, 166
See application file for complete search history.

(56) References Cited

U.S. PATENT DOCUMENTS

| 4,783,038 | A | * | 11/1988 | Gilbert et al. | 248/570 |
| 5,240,232 | A | * | 8/1993 | Loziuk | 267/136 |
| 5,277,394 | A | * | 1/1994 | Slemmer | 248/570 |
| 5,441,243 | A | * | 8/1995 | Loziuk | 267/136 |
| 5,522,585 | A |   | 6/1996 | Loziuk | |
| 5,791,636 | A | * | 8/1998 | Loziuk | 267/136 |
| 8,640,593 | B2 |  | 2/2014 | Hazan | |

FOREIGN PATENT DOCUMENTS

| DE | 4011963 | 10/1990 | |
| EP | 1138974 | 10/2001 | |
| KR | 2013005010 A | * 1/2013 | ............. F16F 15/06 |
| WO | 9312367 | 6/1993 | |

OTHER PUBLICATIONS

International Search Report and Written Opinion for PCT/EP2011/058675 dated Jun. 29, 2011.
Office Action dated Oct. 2, 2015 in U.S. Appl. No. 14/688,798.

* cited by examiner

*Primary Examiner* — Alfred J Wujciak
(74) *Attorney, Agent, or Firm* — Snell & Wilmer L.L.P.

(57) ABSTRACT

There is disclosed a device comprising two wire rope isolators for isolating an object from external motions.
The wire rope isolators are arranged such that, if one of the two wire rope isolators is loaded in compression, then the other wire rope isolator is loaded in tension.

11 Claims, 9 Drawing Sheets

DEVICE FOR ISOLATING AN OBJECT FROM EXTERNAL MOTIONS

CROSS-REFERENCE TO RELATED APPLICATIONS

This application is a U.S. national phase filing under 35 U.S.C. §371 of PCT/EP2011/058675 filed May 26, 2011, which application claims priority to and the benefit of European Application No. 10164781.6, filed on Jun. 2, 2010. All of the aforementioned applications are incorporated herein by reference in their entirety.

FIELD OF THE INVENTION

The present invention relates to a device for isolating an object from external motions. For example, the invention is particularly applicable to mechanical isolators against shocks and vibrations.

BACKGROUND

Absorbing shocks and vibrations is a typical problem encountered in mechanics related domains. Most usual solutions are based on combining a spring, for example a helical or a disc-shaped belleville spring, with a unidirectional damper, for example a viscous liquid damper or a rubbery/elastomeric damper. A major disadvantage of these isolators is that they involve complex constructions, especially to ensure liquid or air sealing. In addition, they often involve hitting between elements. Moreover, their properties may depend on the ambient temperature.

Wire rope isolators (WRI's) constitute another common type of mechanical isolators against shocks and vibrations, including for example polycal WRI's, helical WRI's, ring-type WRI's, straight cable WRI's and other special WRI's. The FIG. 1 illustrates a helical WRI of the prior art, along with its main loading directions. The exemplary helical WRI comprises two retainer bar assemblies arranged parallel with an x-axis, each retainer bar assembly comprising holes. The two retainer bar assemblies are bound one to the other by a single cable, the cable bent between the bar assemblies, passing through their holes and generally clamped by each of the retainer bar assemblies using screws. The direction along the x-axis is called the shear direction, the direction along the y-axis is called the roll direction and the direction along the z-axis is called the tension-compression direction. For polycal WRI's, the difference between the roll and the shear directions is less obvious. For ring-type WRI's, the roll and the shear directions are equivalent and best known as the radial direction.

A major disadvantage of WRI's is that they are omnidirectional dampers with directionally dependent stiffness and damping properties, which results in the circumstance that the tuning of an application based on WRI's is difficult.

Yet another disadvantage of WRI's is that the maximum attainable distance from a single interface plane with a given size to the elastic centre of an optimised set-up of spring-damper elements will be smaller for a set-up with omnidirectional springs as compared to an optimised set-up with unidirectional springs. That is, if only a single interface plane is available, then achieving balance of an isolated object requires more space using a set-up with omnidirectional springs. This drawback of the WRI's will be further explicated in the following, as well as how it may be overcome by the present invention.

Yet another disadvantage of WRI's is that the size of an omnidirectional WRI in the tension-compression direction generally becomes significantly larger due to repeated force-deflection cycling in the tension-compression direction and even due to repeated force-deflection cycling in the roll direction. This effect is believed to be caused by plastic deformation of the wires of the steel cable. Because the external load levels and the accompanying material stress levels are much higher upon tension than compression, the plastic deformation tends to increase the size of the WRI in the tension direction. A consequence of this phenomenon is that the average gravity loaded position of an object isolated with omnidirectional WRI's, relative to its direct surroundings, is not constant, but changing with repeated loading during the lifetime of the WRI's. In addition, depending on the location and orientation of the WRI's, the average orientation of the isolated object may be affected. Moreover, due to the increase of size in the tension direction, the amount of travel available for shock isolation in the tension direction becomes smaller than initial, resulting in higher maximum residual accelerations.

In an attempt to overcome some of the aforementioned drawbacks, the U.S. Pat. No. 5,482,259 discloses a unidirectional damper to be used as a pipe restraint, which makes use of the shear direction of a single helical WRI. A major disadvantage of a unidirectional damper according to the U.S. Pat. No. 5,482,259 is that it is hardly applicable to practical shock damping, as shock damping requires a rather high (initial) stiffness, in order to limit the displacements due to gravity and dynamic excitations with low frequency content. In fact, the mass of a unidirectional damper according to U.S. Pat. No. 5,482,259, which would be required to achieve a stiffness value suitable for practical shock damping, would be very large.

SUMMARY

The present invention aims at providing a solution that may be used to overcome at least some of the technical problems described above. In particular, it aims to provide a device with high (initial) stiffness over own mass ratio, which may thus be suitable for shock damping. At its most general, the invention proposes a device comprising two wire rope isolators for isolating an object from external motions. The wire rope isolators are arranged such that, if one of the two wire rope isolators is loaded in compression, then the other wire rope isolator is loaded in tension.

Advantageously, each of the two wire rope isolators comprising two retainer bars flexibly connected one to the other by at least one cable, the device may comprise linear guiding means allowing only for a relative displacement of some of the retainer bars with respect to the other retainer bars in a single direction, said direction being the common tension-compression direction of the two wire rope isolators.

In a preferred embodiment, the device comprising an upper wire rope isolator and a lower wire rope isolator, each wire rope isolator comprising an upper retainer bar and a lower retainer bar, the upper retainer bar of the upper wire rope isolator may be rigidly connected to the lower retainer bar of the lower wire rope isolator by virtue of bridging means. The lower retainer bar of the upper wire rope isolator may be rigidly connected to the upper retainer bar of the lower wire rope isolator, said rigidly connected retainer bars forming a central retainer bar assembly between the two wire rope isolators.

Preferably, the bridging means may include at least one tube, of which one of the ends may be rigidly connected to the upper retainer bar of the upper wire rope isolator and of which other end may be rigidly connected to the lower retainer bar of the lower wire rope isolator.

Preferably, the linear guiding means may comprise a hollow connecting rod rigidly connected to the central retainer bar assembly and arranged substantially parallel with the common tension-compression direction of the two wire rope isolators. The linear guiding means may also comprise a guiding pin rigidly connected to the lower retainer bar of the lower wire rope isolator and arranged substantially parallel with the common tension-compression direction of the two wire rope isolators. The linear guiding means may also comprise a guide bush rigidly connected to the upper retainer bar of the upper wire rope isolator. The hollow connecting rod may slide through the guide bush and over the guiding pin.

For example, the hollow connecting rod may comprise, at its end opposite to the guiding pin, an upper universal revolute joint, and the guiding pin may comprise, at its end opposite to the hollow connecting rod, a lower universal revolute joint. The two universal revolute joints may be spherical bearings.

Advantageously, at least one of the two wire rope isolators may be a polycal wire rope isolator or a helical wire rope isolator or a ring-type wire rope isolator.

Preferably, the device may comprise means to limit rotation around the common tension-compression direction of the two wire rope isolators. For example, these means may comprise a pin extending through one of the spherical bearings, one of the retainer bars comprising two protrusions arranged so as to slide over the cylindrical surface of the pin when the isolated object moves. In another embodiment, the means to limit rotation may comprise one or two cables rigidly connected to one of the retainer bars at one of their ends, the cables being rigidly connected to the surroundings of the object at their other ends.

Thus, a major advantage provided by a device according to the present invention is that it is provides a simple, reliable and easy-to-tune unidirectional damper, with more linear and substantially temperature-independent force-deflection properties and anti-bottoming feature.

Another advantage provided by a damper according to the present invention is that, despite plastic deformation occurs during use in each of its two WRI's, similarly as in a single WRI, their total external dimension in the tension-compression direction is constrained by the bridging means. Thus, an internal compression load develops by repeated loading during the lifetime of the damper. Because the total dynamic loads on and the resulting plastic deformation in each of the two WRI's is approximately equal, the average position of the central retainer bar assembly and thus the external dimension of two assembled WRI's is not significantly affected. Thus, the position and orientation of an object isolated with the damper is not affected by repeated loading as much as for an object isolated with common omnidirectional WRI's. Also the available shock travel in both loading directions remains approximately equal to the initial value, resulting in similar maximum residual accelerations for similar shocks during the lifetime of the damper.

BRIEF DESCRIPTION OF THE DRAWINGS

Non-limiting examples of the invention are described below with reference to the accompanying drawings in which.

DESCRIPTION OF THE PREFERRED EMBODIMENTS

Figure 1:
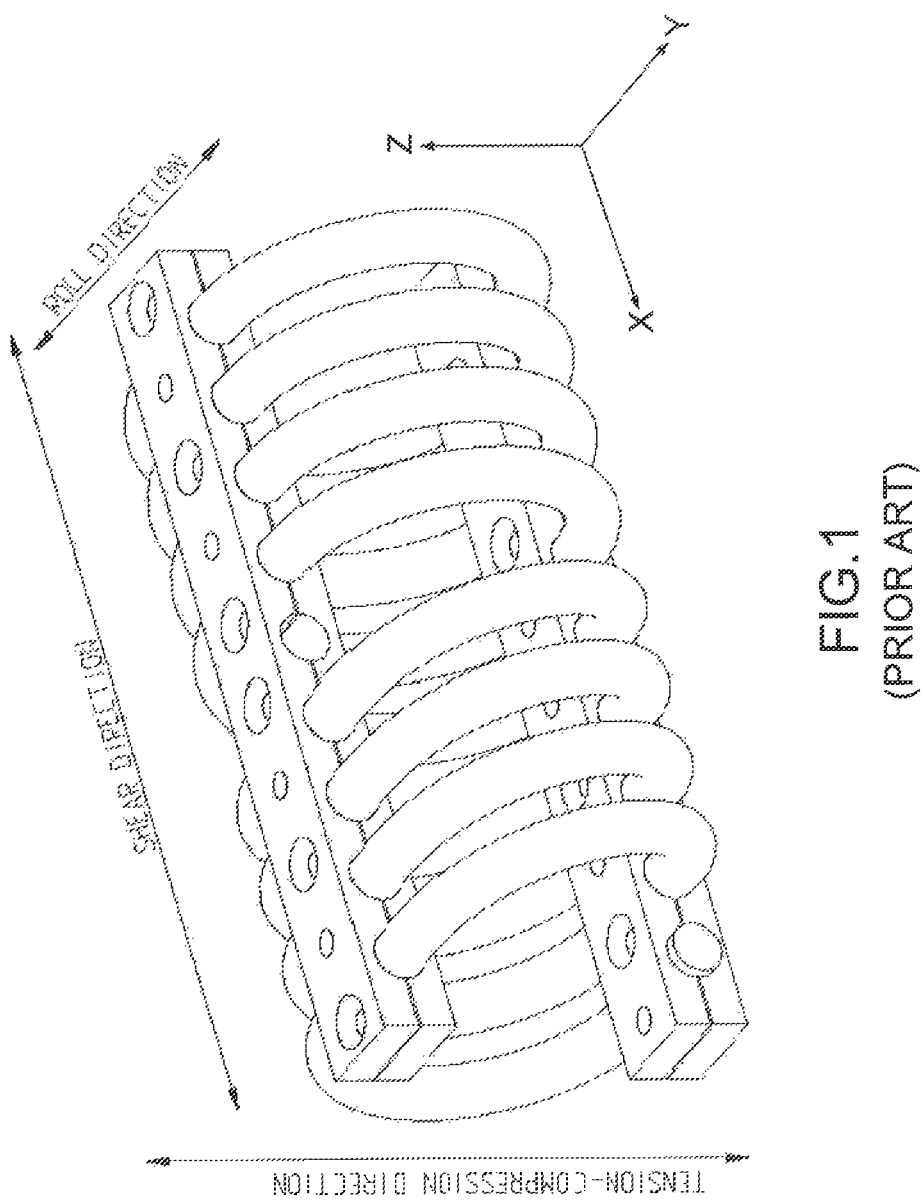
FIG. 1 schematically illustrates a helical Wipe Rope Isolator according to the prior art.
Figure 2:
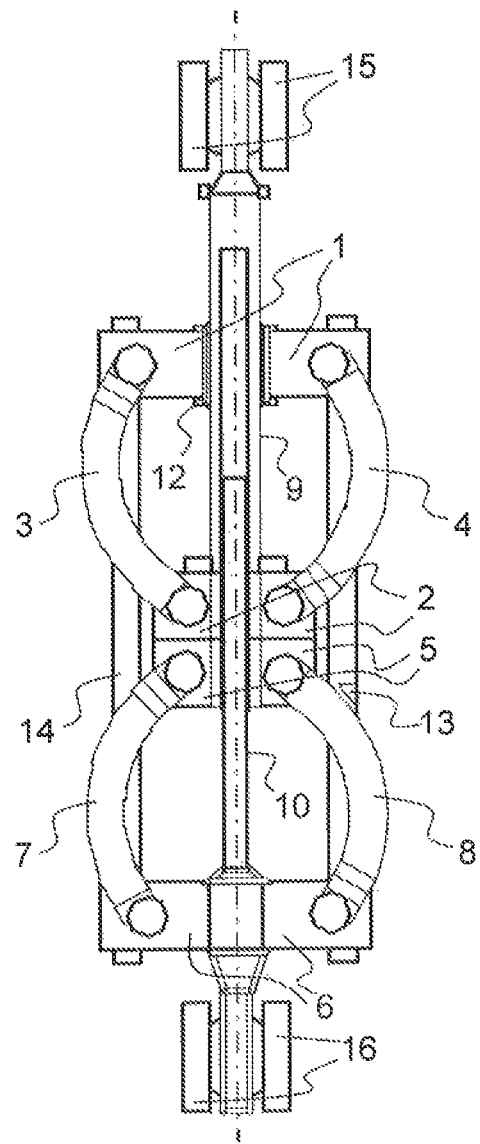
FIG. 2 schematically illustrates by a cross section an exemplary embodiment of a unidirectional damper according to the invention.

FIG. 2 schematically illustrates by a cross section an exemplary embodiment of a unidirectional damper according to the invention. The exemplary embodiment may comprise two similar WRI's, for example two standard polycal WRI's. An upper polycal WRI may comprise an upper retainer bar 1 and a lower retainer bar 2, the upper retainer bar 1 and the lower retainer bar 2 being flexibly connected by cable loops 3 and 4. A lower polycal WRI may comprise a lower retainer bar 6 and an upper retainer bar 5, the upper retainer bar 5 and the lower retainer bar 6 being flexibly connected by cable loops 7 and 8. The two adjoining retainer bars 2 and 5 of the upper and the lower WRI respectively, may be rigidly connected. In another embodiment, the two retainer bars 2 and 5 may be replaced by a same and single integrated retainer bar. In the present embodiment, the two retainer bars 2 and 5 may be rigidly connected to a hollow connecting rod 9. The hollow connecting rod 9 may slide over a central guiding pin 10 as well as slide through a guide bush 12. The sliding interfaces may be realized by loose fits. The central guiding pin 10 may be rigidly connected to the lower retainer bar 6. The guide bush 12 may be rigidly connected to the upper retainer bar 1. It is important noting that the hollow connecting rod 9 and the guiding pin 10 are arranged parallel with the tension-compression direction of the two WRI's. A rigid connection may bridge between the upper and lower retainer bars 1 and 6, for example two hollow tubes 13 and 14 mounted to the upper and lower retainer bars 1 and 6 by bolts or nuts. Universal revolute joints may be arranged at both mounting interfaces, for example implemented by spherical bearings 15 and 16, so as to obtain a unidirectional mode of working whilst allowing relative rotations to the surroundings to which the damper is connected. The guiding pin 10, the hollow connecting rod 9 and the guide bush 12 form a linear guiding system, which ensures a relative rectilinear motion between the mounting interfaces of the damper. It also enables a sufficiently high bending stiffness and sufficiently high resonance frequencies of the bending modes of the damper, as well as prevents buckling during compression of the damper.

During displacements of the hollow connecting rod 9 over the central guiding pin 10 and through the guide bush 12, the upper and the lower WRI's are used in their compression and tension directions only, these directions providing the highest stiffness, thus resulting in an unidirectional combination with the highest possible stiffness over own mass ratio. In addition, the compression of one WRI is accompanied with the tension of the other WRI. Actually, their output reaction forces are summed, as they are mechanically placed parallel. Hereby, the stiffening behaviour of the tension direction of one WRI is partly compensated by the softening behaviour of the compression direction of the other WRI. This results in a more linear force-deflection characteristic. The maximum displacement of the combination equals the maximum displacement of each individual WRI.

Moreover, at maximum displacements of the hollow connecting rod 9 over the central guiding pin 10 and through the guide bush 12, the cable loops of the WRI loaded in tension tend to straighten, by which the force increases more rapidly, resulting in a stiffening force-deflection behaviour and in an effective anti-bottoming measure.

Figure 3B:
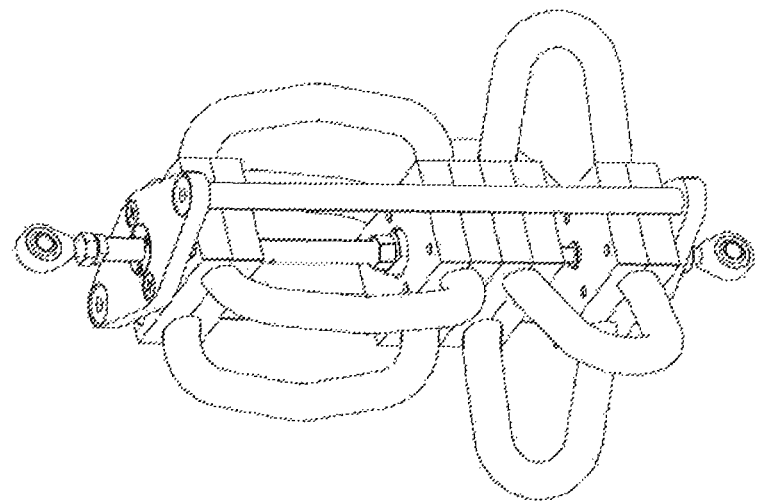
FIGS. 3a and 3b schematically illustrate by perspective views another exemplary embodiment of a unidirectional damper according to the invention.
Figure 3A:
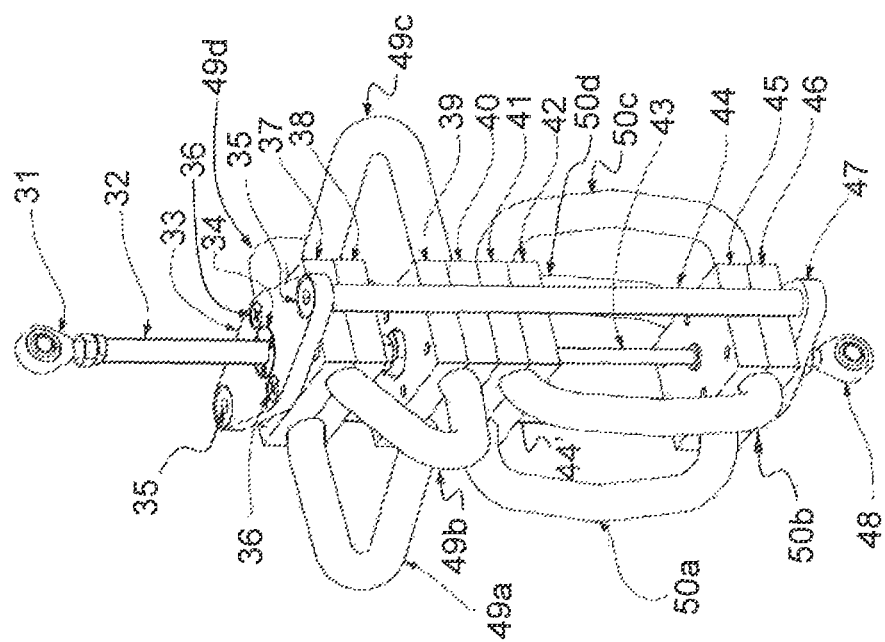

FIGS. 3a and 3b schematically illustrate by perspective views another exemplary embodiment of a unidirectional damper according to the invention, based on commercially available polycal WRI's. The extended position of the damper is illustrated by FIG. 3a, while its compressed position is illustrated by FIG. 3b. For the sake of clarity, references have been inserted only in FIG. 3a. The damper may comprise an upper polycal WRI, said upper polycal WRI comprising an outer part 37 and an inner part 38 of an upper retainer bar, as well as an inner part 39 and an outer part 40 of a lower retainer bar, said upper and lower retainer bars being connected by four upper cables 49a, 49b, 49c and 49d. The damper may also comprise a lower polycal WRI, said lower polycal comprising an outer part 41 and an inner part 42 of an upper retainer bar, as well as an inner part 45 and an outer part 46 of a lower retainer bar, said upper and lower retainer bars being connected by four lower cables 50a, 50b, 50c and 50d. The outer part 40 of the lower retainer bar of the upper polycal WRI may be rigidly connected to the outer part 41 of the upper retainer bar of the lower polycal WRI by virtue of a stud and of screws, which are not visible on FIGS. 3a and 3b. The damper may comprise a connecting rod 32 with an upper rod end 31, the connecting rod 32 sliding through a guide bush 34 and over a guiding pin 43 with a lower rod end 48. The guide bush 34 may be rigidly connected to an upper flange 33. The upper flange 33 may be rigidly connected to two tubes 44 and 44 by virtue of two upper bolts 35 and 35' respectively. The two tubes 44 and 44' may be rigidly connected to a lower flange 47 by virtue of two bolts respectively, which are not visible on FIGS. 3a and 3b. The outer part 37 of the upper retainer bar of the upper polycal WRI may be rigidly connected to the upper flange 33 by virtue of two upper screws 36 and 36', while the outer part 46 of the lower retainer bar of the lower polycal WRI may be rigidly connected to the lower flange 47 by virtue of two screws, which are not visible on FIGS. 3a and 3b.

It is worth noting that, in order to achieve a design with less parts and a smaller mass, the design may be further optimised, especially by modifying the central retainer bar assembly between the two polycal WRI's and by replacing the outer part of the upper retainer bar of the upper WRI and the adjoining flange with a single part as well as by replacing the outer part of the lower retainer bar of the lower WRI and the adjoining flange with a single part.

Figure 4A:
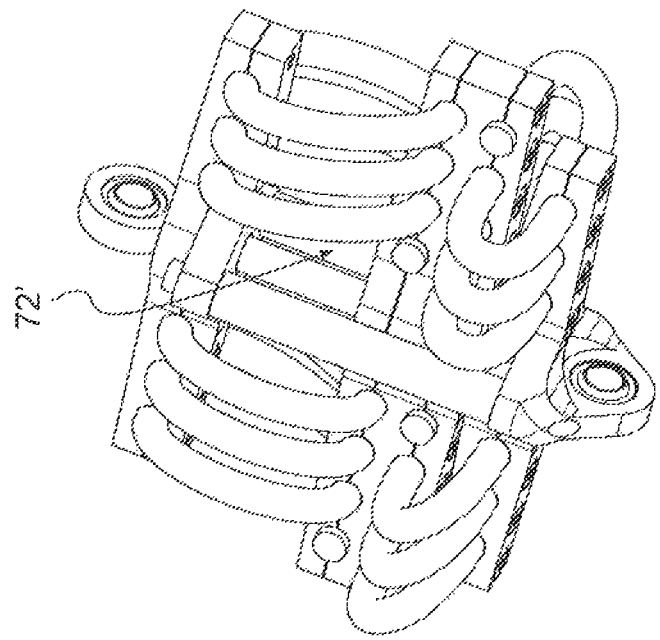
FIGS. 4a and 4b schematically illustrate by perspective views yet another exemplary embodiment of an unidirectional damper according to the invention.
Figure 4B:
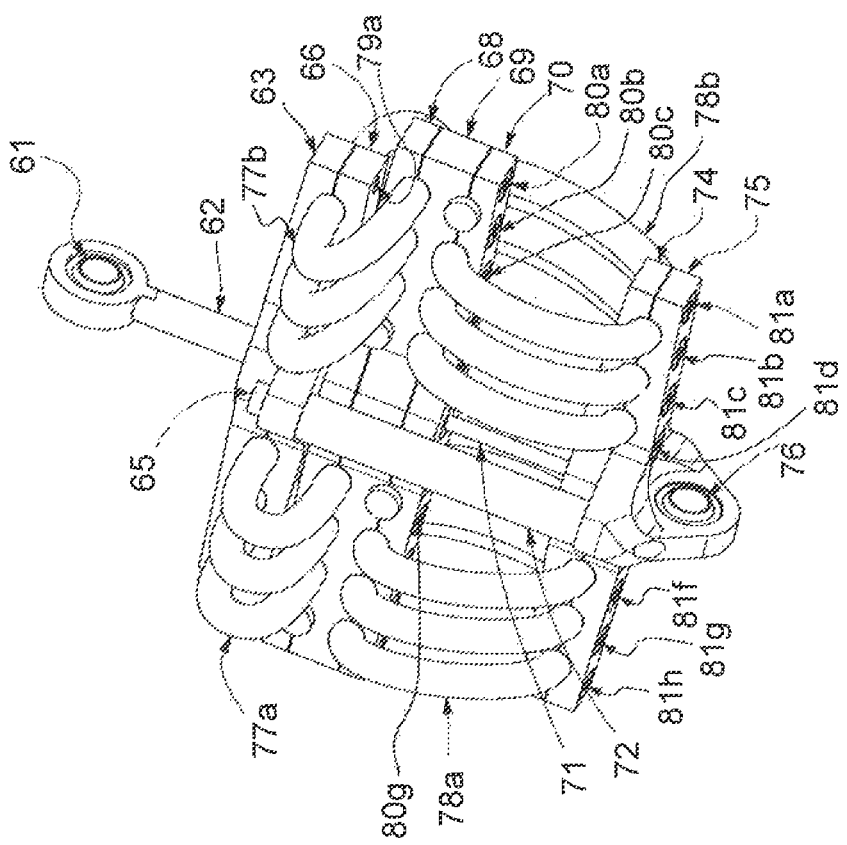

FIGS. 4a and 4b schematically illustrate by perspective views yet another exemplary embodiment of a unidirectional damper according to the invention, in which two sets of two helically wound cables are clamped by three retainer bar assemblies. The extended position of the damper is illustrated by FIG. 4a, while its compressed position is illustrated by FIG. 4b. For the sake of clarity, references have been inserted only in FIG. 4a. The damper may comprise an upper WRI comprising an outer part 63 and an inner part 66 of an upper retainer bar, as well as an upper part 68 and a central part 69 of a middle retainer bar, said upper and middle retainer bar being connected by two upper cables 77a and 77b. The outer part 63 and the inner part 66 of the upper retainer bar may be rigidly connected by virtue of eight screws 79a to 79h, the screws 79b to 79h not being visible on FIGS. 4a and 4b. The damper may also comprise a lower WRI comprising an outer part 75 and an inner part 74 of an lower retainer bar, as well as a lower part 70 and the central part 69 of the middle retainer bar, said lower and middle retainer bar being connected by two lower cables 78a and 78b. The outer part 75 and the inner part 74 of the lower retainer bar may be rigidly connected by virtue of eight screws 81a to 81h, the screw 81e not being visible on FIGS. 4a and 4b. The upper part 68, the central part 69 and the lower part 70 of the middle retainer bar may be rigidly connected by virtue of ten screws 80a to 80j, the screws 80d, 80e, 80f, 80g, 80h, 80i and 80j not being visible on FIGS. 4a and 4b. Alternatively, in order to assist more easy mounting of the unidirectional damper assembly, only the central part 69 and the lower part 70 of the middle retainer bar may be rigidly connected by the virtue of ten (shorter) screws 80a to 80j, the screws 80d, 80e, 80f, 80g, 80h, 80i and 80j not being visible on FIGS. 4a and 4b, while the upper part 68 and the central part 69 of the middle retainer bar may be rigidly connected by the virtue of ten screws 80k to 80t, none of which is visible on FIGS. 4a and 4b. The damper may comprise a connecting rod 62 with an upper spherical bearing 61, the connecting rod 62 sliding through a guide bush, which is not visible on FIGS. 4a and 4b, and over a guiding pin 71. The inner part 66 of the upper retainer bar of the upper WRI may be rigidly connected to two tubes 72 and 72, the tube 72 not being visible on FIG. 4a however being visible on FIG. 4b, by virtue of bolts 65 and 65' respectively, the bolt 65' not being visible on FIGS. 4a and 4b. The two tubes 72 and 72' may be rigidly connected to the outer part 75 of the lower retainer bar of the lower WRI by virtue of two bolts respectively, which are not visible on FIGS. 4a and 4b. The outer part 75 of the lower retainer bar of the lower WRI may comprise a lower spherical bearing 76.

It is important understanding that, despite the preceding exemplary embodiments of the invention are based on polycal and helical WRI's, other types of WRI's may also be put to use without departing from the scope of the present invention. It is also worth noting that the exemplary embodiment with helical WRI's may have a higher stiffness and may thus be suitable for higher loads than the embodiment with polycal WRI's, because more cable loops are available and because the maximum cable diameter of commercially available helical WRI's is larger than that of commercially available polycal WRI's. Anyway, the type and the class of WRI's should be chosen on the basis of the stiffness and maximum displacement requirements. Then, the guiding and bridging means should be physically combined by virtue of dedicated WRI retainer bar assemblies. For the cables, best austenitic stainless steel should be used, similar as the steel used in common WRI's. For the screws and bolts, also austenitic stainless steel should be preferred. For the other parts, a high strength aluminium alloy should preferably be used, for example a precipitation hardening copper containing aluminium alloy. For parts of the linear guidance system, such as the guide bush, the guiding pin and the connecting rod, ferritic, martensitic or austenitic stainless steel may optionally be used in order to reduce friction and wear of the sliding interfaces.

Figure 5:
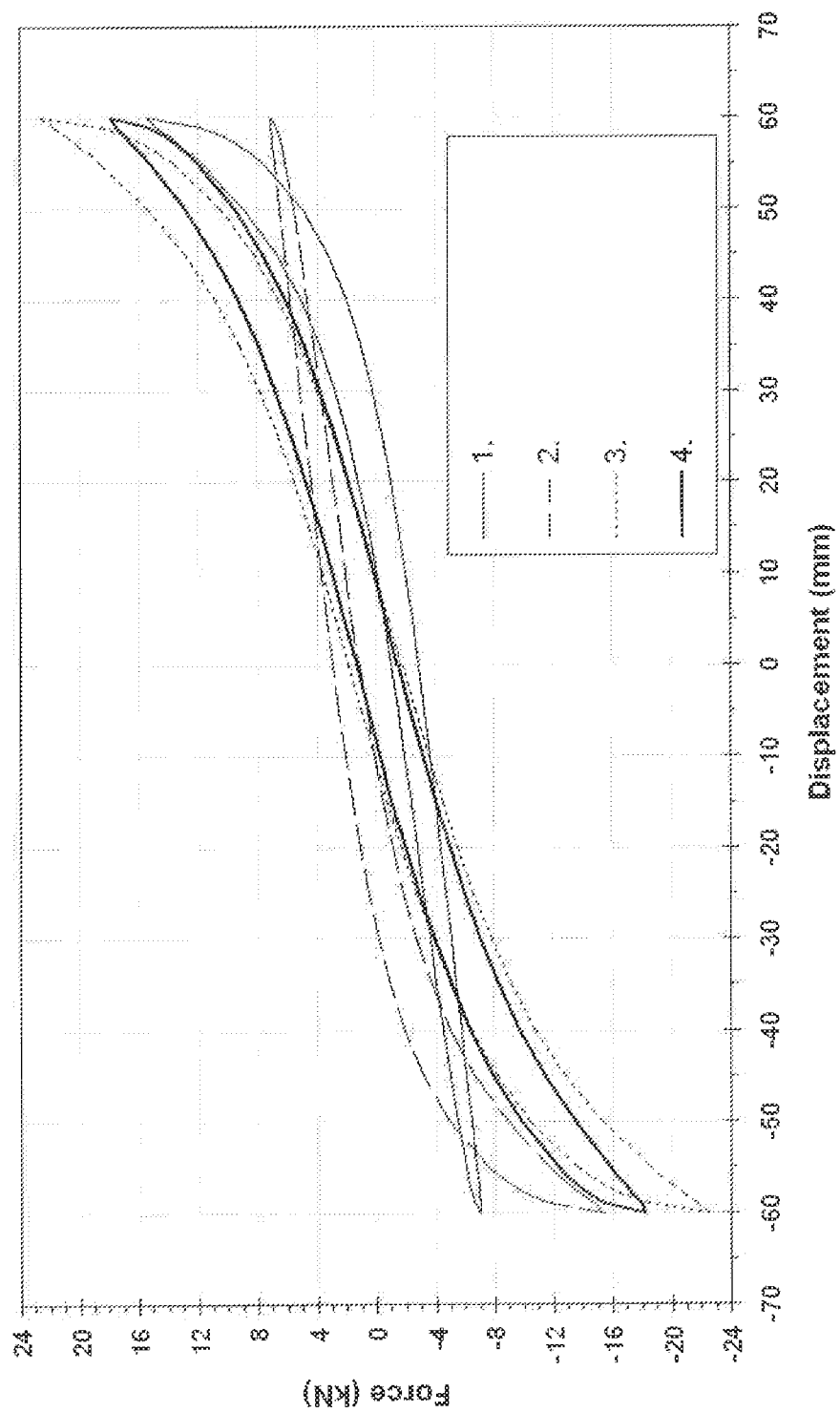
FIG. 5 schematically illustrates graphically the efficiency of an exemplary unidirectional damper according to the invention.

FIG. 5 shows force-deflection curves in a system of axes where the horizontal axis represents a displacement in millimeters (mm) and the vertical axis represents a force in kiloNewton (kN). A force-deflection curve 1 has been actually measured in the tension compression direction of a real single polycal WRI for a displacement ranging from −60 to +60 mm, after previous repeated loading with smaller displacement ranges. A curve 2 has been obtained by reflection of the curve 1 using the origin (0 mm, 0 N) as the point of reflection. The curve 2 is theoretically valid for a polycal WRI operating in the opposite direction. A curve 3 has been obtained by summation of the curve 1 and the curve 2. The curve 3 is theoretically valid for a hypothetical unidirectional combination of two polycal WRI's. A curve 4 has been actually measured in the tension compression direction of a real prototype of a damper according to the present invention.

It is important noticing that the average load of curve 1 at 0 mm displacement is not 0 N, but about −2 kN. This is due to the plastic deformation in the polycal stainless steel cables, which occurred during the previous applied repeated force deflection cycling. At 0 mm relative displacement, which corresponds to the original size of the polycal WRI in tension direction, a compressive load developed. The unloaded size of the polycal WRI is about 20 mm larger than original.

The curve 3 is a theoretical approximation of the behaviour of a unidirectional damper according to the invention, incorporating the force-deflection behaviour of the two polycal WRI's only. It appears that the measured force-deflection behaviour of the prototype of the unidirectional damper represented by the curve 4 has the same shape, but is significantly less stiff. This is due to the limited stiffness of the other parts used for construction of the prototype. Especially the separate upper and lower flanges 33 and 47 illustrated by FIGS. 3a and 3b show appreciable bending. By integrating these flanges with parts of the retainer bars a more stiff construction is obtained. This has been realised in the design of the unidirectional damper illustrated by FIGS. 4a and 4b.

In view of the preceding, it is clear that the present invention enables straightforward balancing of isolated objects.

Figure 6A:
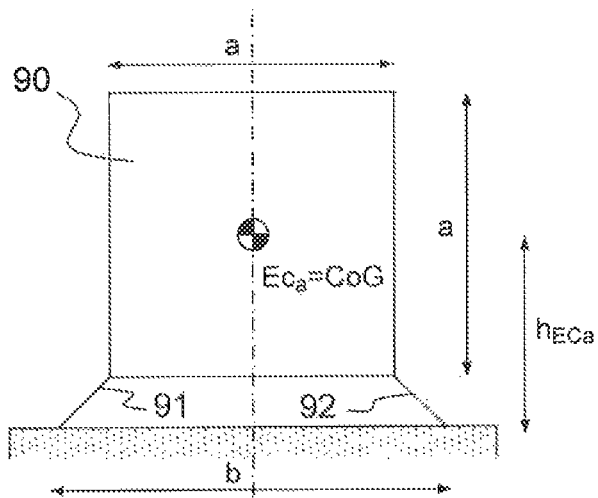
FIGS. 6a, 6b, 6c and 7 schematically illustrate further advantages of using unidirectional dampers according to the present invention.
Figure 6B:
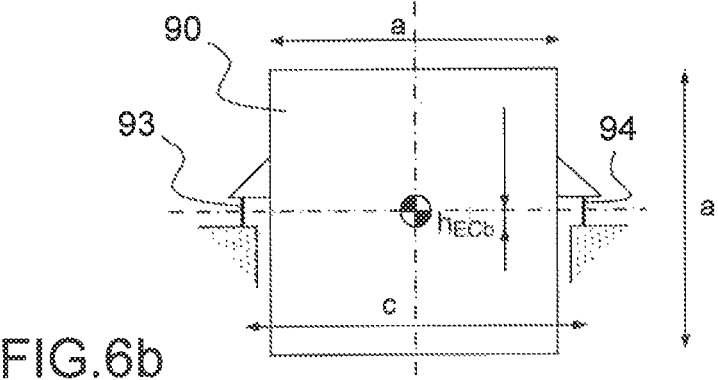
Figure 6C:
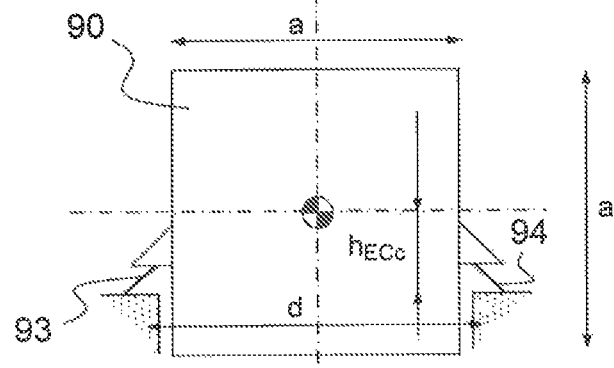

In addition, FIGS. 6a, 6b and 6c illustrate another major advantage of an unidirectional damper according to the invention as compared to omnidirectional WRI's using 2-dimensional sketches.

FIG. 6a illustrates an object 90 having a squared section of a length a. The object 90 is isolated by virtue of a mechanical isolation set-up comprising two unidirectional dampers 91 and 92 according to the invention. The dampers 91 and 92 are arranged with a distance b between their lower ends and with their main axes making angles of 45° with the vertical direction, such that the elastic centre $EC_a$ of the isolation set-up is at the same location as the centre of gravity CoG of the object 90, EC and CoG standing at a same height $h_{ECa}$.

FIG. 6b illustrates the same object 90 isolated by virtue of a mechanical isolation set-up comprising two common polycal or helical WRI's 93 and 94 arranged with a distance c between their lower ends and with their tension-compression direction parallel to the vertical direction, such that the elastic centre $EC_b$ of the isolation set-up is at the same location as the centre of gravity CoG of the object 90, EC and CoG standing at a same height $h_{ECb}$.

FIG. 6c illustrates the same object 90 isolated by use of another mechanical isolation set-up comprising the two same WRI's 93 and 94 arranged with a distance d between their lower ends and with their tension-compression directions making angles of 45° with the vertical direction, such that the elastic centre $EC_c$ of the isolation set-up is at the same location as the centre of gravity CoG of the object 90, EC and CoG standing at a same height $h_{ECc}$.

For each of these three set-ups, the elastic centre coincides with the centre of gravity of the object 90, resulting in a balanced set-up. A balanced set-up means that the that rotations occurring due to translational accelerations are minimized. Vice versa, translations occurring due to rotational accelerations are minimized. Also in this case, the natural vibration modes of the isolated object 90 are uncoupled into pure translation and rotation modes.

With regard to FIGS. 6a, 6b and 6c, the following relations between the distances a, b, c and d and between the heights $h_{ECa}$, $h_{ECb}$ and $h_{ECc}$ are valid:

$$b > d > c > a$$

$$h_{ECa} > h_{ECc} > h_{ECb}$$

The advantage concerns the location of the elastic centre of a mechanical isolation set-up if only a single interface plane to the surroundings is available. The distance from the interface plane to the elastic centre can be larger if unidirectional dampers are employed. For a balanced set-up, the centre of gravity of the mechanically isolated object and the elastic centre have to coincide. A balanced set-up means that rotations occurring due to translational accelerations are minimized. Also in this case, the natural vibration modes of the isolated object are uncoupled into pure translation and rotation modes. Thus, by use of unidirectional dampers according to the invention, higher balanced isolated objects may be achieved.

It is also worth noting that the two unidirectional dampers according to the invention of FIG. 6a, which include four common WRI's in total, theoretically have twice the mass loading capacity of a single common WRI, because two mutually perpendicular directions are supported. For easy and fair comparison, fair meaning that the stiffnesses in vertical direction, the mass loading capacities in vertical direction as well as the frequencies of the resonance mode in vertical direction of the set-ups in FIGS. 6a to 6c are approximately equal, one common omnidirectional WRI is assumed to be arranged at each corner of the object 90 for the set-ups of FIGS. 6b and 6c. Also omnidirectional WRI's can be placed slanted, for example by 45° as depicted on FIG. 6c. However their transverse stiffness, which is usually 20 to 50% of the tension-compression stiffness, still limits the attainable height of the elastic centre. Usually the mass load capacity of WRI's in the 45° roll-tension-compression direction is presented by WRI suppliers as equal to that of the tension-compression direction. Actually it is smaller, because the load capacity of the roll direction is smaller. Because in a unidirectional damper according to the invention only the stiffness in tension-compression direction is employed and because additional parts are needed, the total effective stiffness over own mass ratio of a complete set-up is smaller and thus worse than for a set-up with common omnidirectional WRI's. However, by use of unidirectional dampers according to the invention, higher balanced isolated objects may be achieved if only a single interface plane to the surroundings is available.

Figure 7:
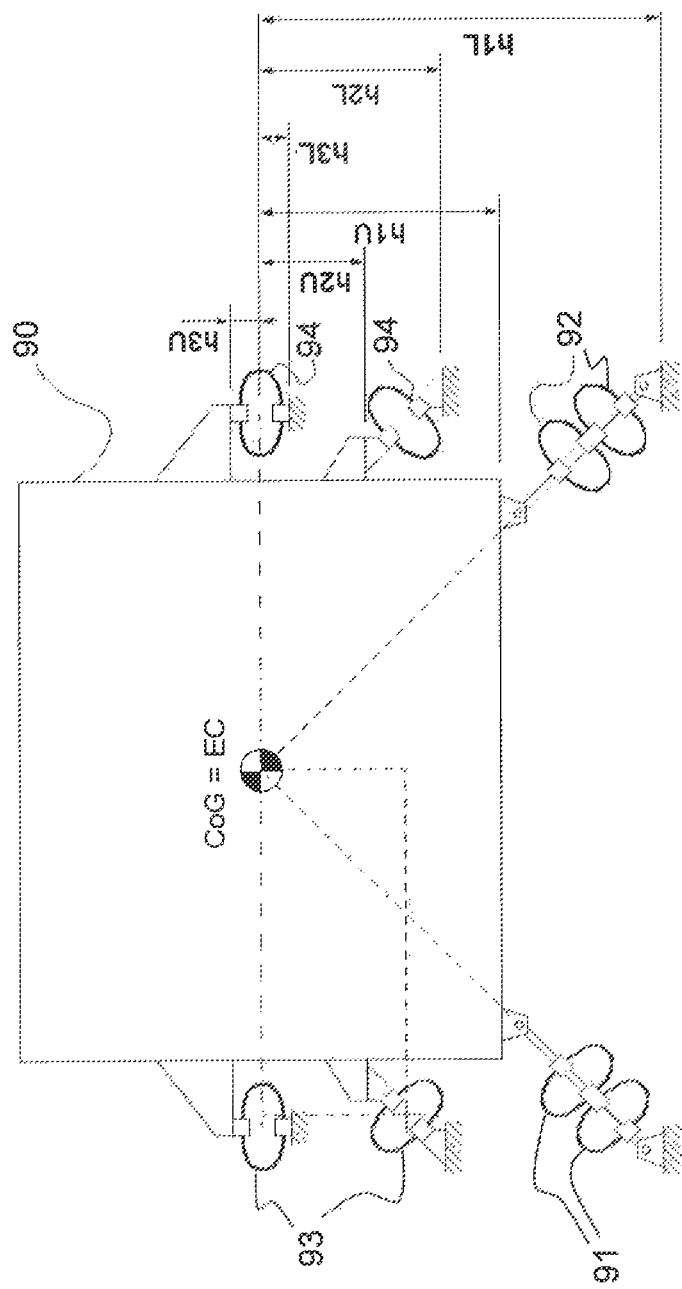

The aforementioned advantage concerning the attainable height of the balanced isolated objects is further illustrated by FIG. 7, which illustrates again the object 90 mechanically isolated by virtue of the same three mechanical isolator set-ups as those illustrated by FIGS. 6a, 6b and 6c.

For the set-up with the unidirectional dampers 91 and 92 according to the invention, the elastic centre is at the height of the crossing of the lines through the main axes of the unidirectional dampers 91 and 92. For the set-up with the common WRI's 93 and 94 arranged slanted by 45°, the elastic centre is at a location depending on the relative stiffness in tension-compression and roll (or shear) directions of the common WRI's 93 and 94. For the set-up with the common WRI's 93 and 94 arranged vertically, the elastic centre is at the same height as the height of the geometric centre of the common WRI's 93 and 94.

Obviously, for the set-up with the unidirectional dampers 91 and 92 according to the invention, the distance from either their upper or lower interface plane to the horizontal plane passing through the centre of gravity is larger than the corresponding distances for the other set-ups with common WRI's 93 and 94, i.e. the following relations are valid:

$$h1L=h_{EC_a}>h2L=h_{EC_c}>h3L=h_{EC_b}$$

$$h1U>h2U>h3U$$

This is yet another advantage if a balanced suspension set-up is required, while only a single interface plane is available for mounting the set-ups and when the distance between the centre of gravity of the object 90 and this interface plane is relatively large, i.e. about one half of the main horizontal dimensions of the object 90.

Figure 8:
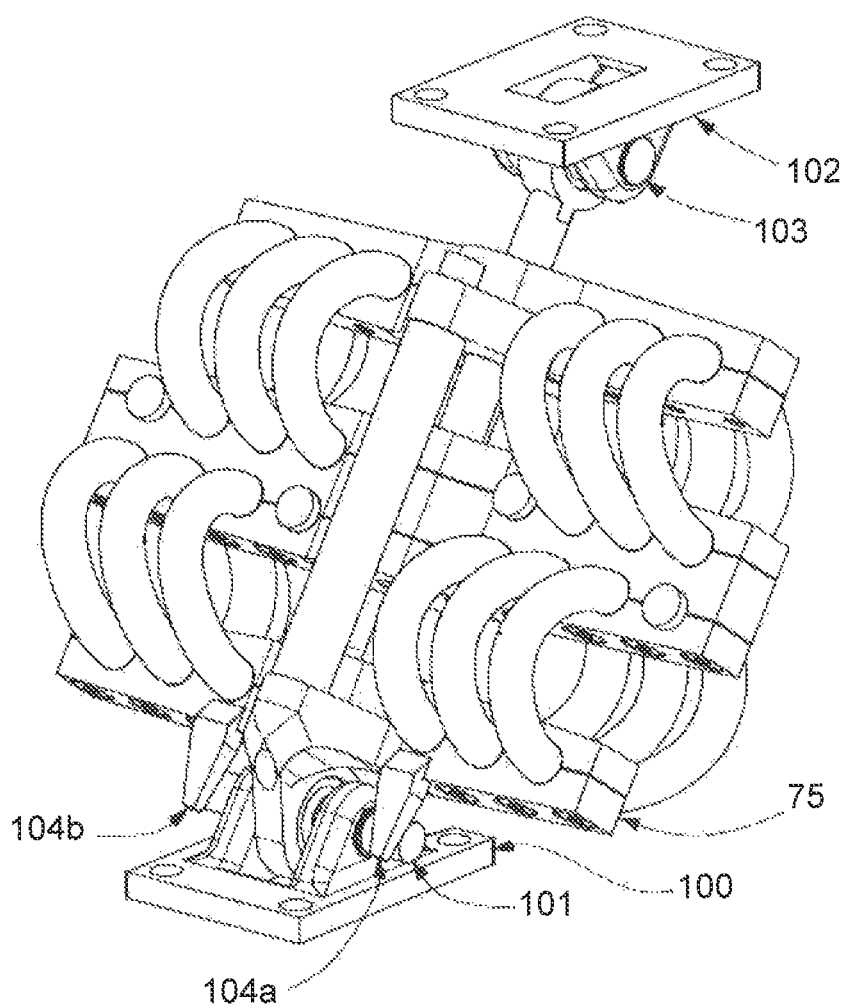
FIGS. 8 and 9 schematically illustrate by perspective views exemplary mountings to the surroundings of an unidirectional damper according to the invention including means to limit the rotation of the damper around the common tension-compression direction.
Figure 9:
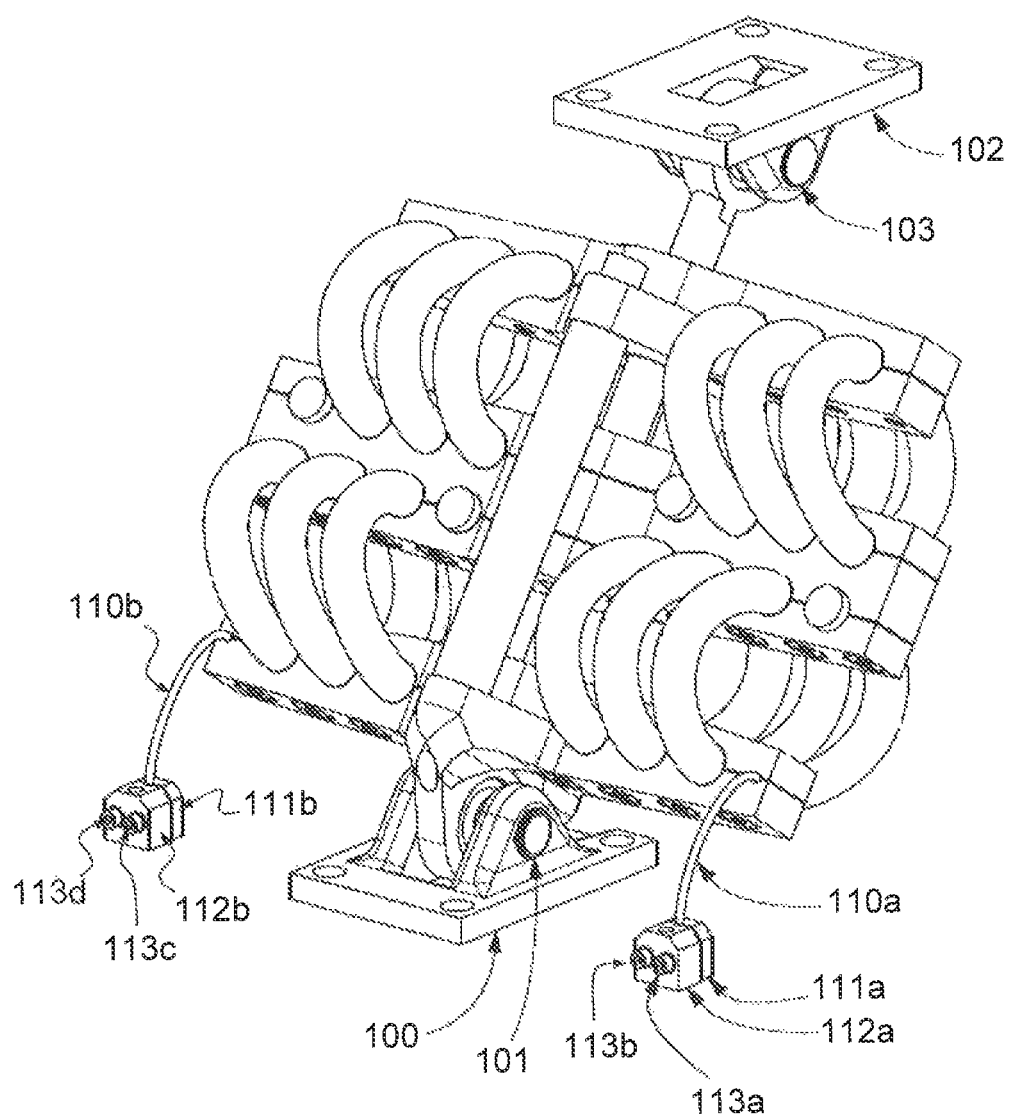

An unidirectional damper according to the invention may be connected to relatively stable surroundings by virtue of mounting feet as illustrated by FIGS. 8 and 9, which show similar exemplary unidirectional dampers as those illustrated by FIGS. 4a and 4b. A rigid connection between a lower foot 100 and the inner part of the lower spherical bearing 76 is realized by a lower pin 101 and a rigid connection between an upper foot 102 and the inner part of the upper spherical bearing 61 is realized by an upper pin 103. After mounting of both the upper and lower feet 100 and 102 to the surroundings respectively, rotation of a unidirectional damper according to FIGS. 4a and 4b around it's main axis remains possible, until for example the outer part 75 of the lower retainer bar of the lower WRI hits against the lower foot 100. To prevent such hitting, additional rotation limiting means may be added.

FIG. 8 illustrates exemplary rotation limiting means, which may comprise two additional protrusions 104a and 104b of the outer part 75 of the lower retainer bar of the lower WRI. The additional protrusions 104a and 104b may be realized by separate parts attached to the outer part 75 or preferably as machined features of the outer part 75 itself. The protrusions 104a and 104b may slide over the cylindrical surface of the lower pin 101, which may advantageously extend beyond the lower foot 101. The contact of each of the protrusions 104a and 104b with lower pin 101 may be constituted by a small loose fit or show limited preload generated by the elastic properties and particular dimensioning of the adjoining parts.

FIG. 9 illustrates other exemplary rotation limiting means, which may comprise at least one of two or possibly two stainless steel anti-rotation cables 110a and 110b, with a relatively small diameter, flexibly connecting the lower retainer bar of the lower WRI to the surroundings. The connection of the cable 110a to the surroundings may be realized by clamping the cable 110a between two blocks 111a and 112a, the blocks 111a and 112a being hold tightly together with bolts 113a and 113b. Similarly, the connection of the cable 110b to the surroundings may be realized by clamping the cable 110b between two blocks 111b and 112b, the blocks 111b and 112b being hold tightly together with bolts 113c and 113d.

The invention claimed is:

1. A device for isolating an object from external motions, wherein the device comprises:
    two wire rope isolators,
    the two wire rope isolators being arranged such that, if one of the two wire rope isolators is loaded in compression, then the other wire rope isolator is loaded in tension,
    each of the two wire rope isolators comprising two retainer bars and at least one cable for flexibly connecting said two retainer bars one to the other, and
    linear guiding means for a relative displacement of some of the retainer bars with respect to the other retainer bars in a single direction, the direction being a common tension-compression direction of the two wire rope isolators;
    and wherein one of the two wipe rope isolators is an upper wire rope isolator and the other of the two wire rope isolators is a lower wire rope isolator, each wire rope isolator comprising an upper retainer bar and a lower retainer bar,
        the upper retainer bar of the upper wire rope isolator being rigidly connected to the lower retainer bar of the lower wire rope isolator by virtue of bridging means, and
        the lower retainer bar of the upper wire rope isolator being rigidly connected to the upper retainer bar of the lower wire rope isolator,
        the linear guiding means comprise a central retainer bar between the two wire rope isolators.

2. The device according to claim 1, wherein the bridging means include at least one tube of which one of the ends is rigidly connected to the upper retainer bar of the upper wire rope isolator and of which other end is rigidly connected to the lower retainer bar of the lower wire rope isolator.

3. The device according to claim 1, wherein the linear guiding means further comprise:
    a hollow connecting rod rigidly connected to the central retainer bar assembly and arranged substantially parallel with the common tension-compression direction of the two wire rope isolators, and;
    a guiding pin rigidly connected to the lower retainer bar of the lower wire rope isolator and arranged substantially parallel with the common tension-compression direction of the two wire rope isolators, and
    a guide bush rigidly connected to the upper retainer bar of the upper wire rope isolator;
    arranged such that the hollow connecting rod slides through the guide bush and over the guiding pin.

4. The device according to claim 3, wherein the hollow connecting rod comprises, at its end opposite to the guiding pin, an upper universal revolute joint, and the guiding pin comprises, at its end opposite to the hollow connecting rod, a lower universal revolute joint.

5. The device according to claim 4, wherein the two universal revolute joints are spherical bearings.

6. The device according to claim 5, comprising means to limit rotation around the common tension-compression direction of the two wire rope isolators, wherein the means to limit rotation comprise a pin extending through one of the spherical bearings, one of the retainer bars comprising two protrusions arranged so as to slide over the cylindrical surface of the pin when the isolated object moves.

7. The device according to claim 1, wherein at least one of the two wire rope isolators is a polycal wire rope isolator.

8. The device according to claim 1, wherein at least one of the two wire rope isolators is a helical wire rope isolator.

9. The device according to claim 1, wherein at least one of the two wire rope isolators is a ring-type wire rope isolator.

10. The device according to claim 1, comprising means to limit rotation around the common tension-compression direction of the two wire rope isolators.

11. The device according to claim 10, wherein the means to limit rotation comprise one or two cables rigidly connected to one of the retainer bars at one of their ends, the cables being rigidly connected to the surroundings of the object at their other ends.

* * * * *